INVENTOR.
RICHARD L. SMITH
BY
ATTORNEY

Dec. 3, 1968   R. L. SMITH   3,414,691
SWITCH FOR SELECTIVELY CONNECTING TWO ELECTRICAL POWER
SOURCES IN EITHER PARALLEL OR SERIES RELATIONSHIP
Filed Jan. 23, 1967   2 Sheets-Sheet 2
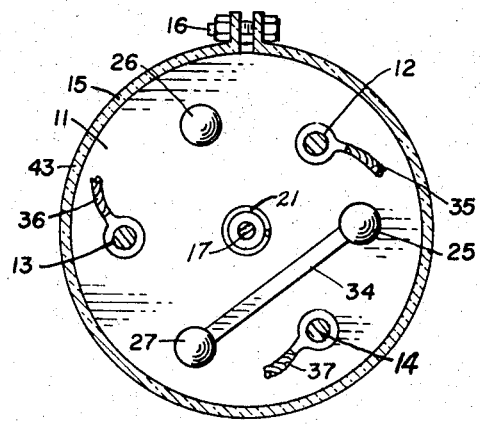
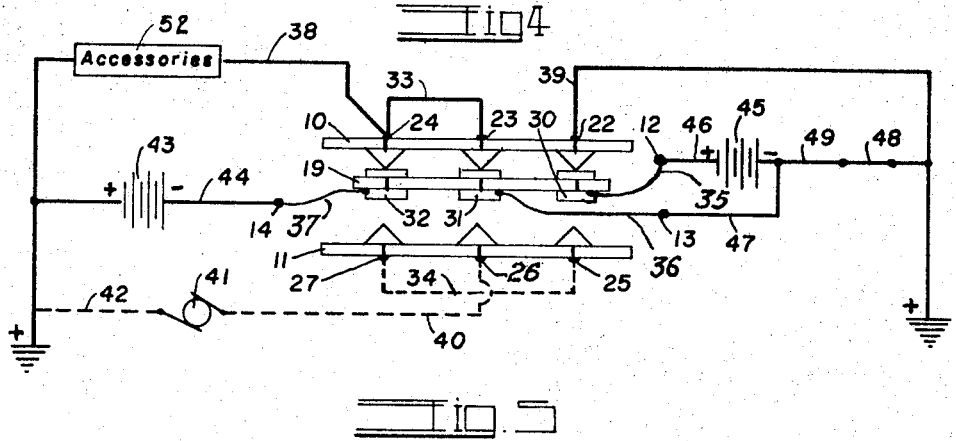
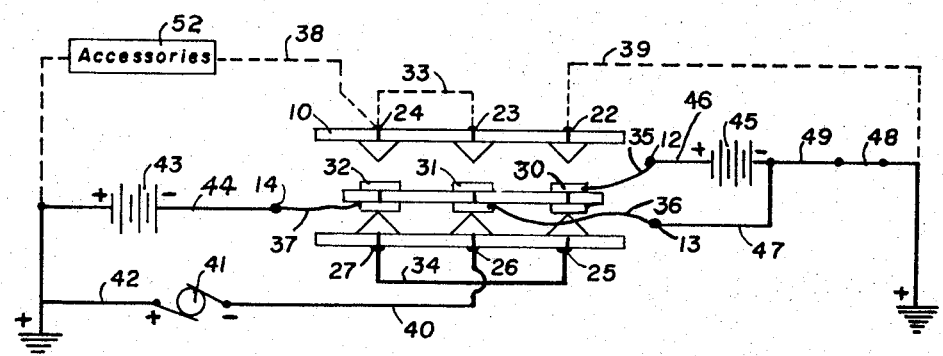
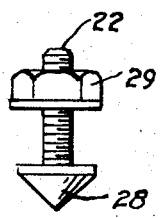
INVENTOR.
RICHARD L. SMITH
BY
ATTORNEY United States Patent Office 3,414,691
Patented Dec. 3, 1968

3,414,691
SWITCH FOR SELECTIVELY CONNECTING TWO ELECTRICAL POWER SOURCES IN EITHER PARALLEL OR SERIES RELATIONSHIP
Richard L. Smith, 140 W. 25th St., Durango, Colo. 81301
Filed Jan. 23, 1967, Ser. No. 610,917
4 Claims. (Cl. 200—16)

ABSTRACT OF THE DISCLOSURE

Top and bottom insulated discs fixedly positioned in vertically spaced, parallel relation with an insulated contact plate positioned for vertical movement therebetween, the top disc having electrical contacts on its bottom, the bottom disc having electrical contacts on its top and the contact plate having contacts respectively exposed on both its top and bottom so that when said plate is urged upwardly, it will close circuits with the contacts of the top disc and when urged downwardly, it will close circuits with the contacts on the bottom disc.

---

This invention relates to a starter switch for use on automotive vehicles of the type provided with "series-parallel" electric systems operating from two independent batteries (or two similar banks of batteries) which, in the running position, are connected in parallel to supply a relatively low voltage to the accessories and which, in the starting position, are connected in series to supply a relatively high voltage to the starting motor.

A typical present "series-parallel" system uses two six-volt batteries. In the running or parallel position, both batteries are positively grounded and the negative lead from each battery is connected to the grounded accessories to energize the latter with six volts of current from both batteries. A series-parallel switch is provided which when actuated to the "series" position leaves one battery positively grounded so as to still supply six volts to the accessories. The other battery is temporarily ungrounded and connected in series with the first battery to supply twelve volts through a starter switch to the starter. Thus, when the starting switch is actuated, said one battery is simultaneously functioning in both a parallel and a series circuit and is susceptible to current losses from the accessories and to line feed back resulting in burned ground connections and damaged switch contacts.

Briefly, this invention comprises, and has for its principal object, the provision of a single, relatively simple, economical, spring-loaded, push-button type of switch which will combine a series-parallel switch with a starter switch so that a single manual actuation will completely disconnect the accessory circuits, and instantly connect the batteries in series and simultaneously close a starter circuit from the series-connected batteries to the starter motor and which when released will automatically disconnect the starter circuits and instantly restore the accessory circuits to their original normal parallel operation, thus avoiding damage from overloads, feed backs, and the accessory over-voltages usually encountered in conventional series-parallel switches.

Another object is to provide a series-parallel switch which simultaneously energizes an ignition circuit at double-voltage when the batteries are connected in series for starting so as to increase the starting efficiency of the engine.

A further object is to provide a single switch device which will efficiently combine the functions of a series-parallel switch and a starter switch, which can be manually or solenoid operated, in which the contacts will be readily accessible for cleaning and repairing without dismantling, and in which the contact pressure will be uniform on all contacts to prevent arcing and overloading of any single contact.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 4 is a similar horizontal cross-section taken on the line 4—4, FIG. 2;

FIG. 5 is a circuit diagram illustrating the switch and its connected circuits in the "parallel" driving position;

FIG. 6 is a similar diagram illustrating the switch and circuits in the starting or series position; and FIG. 7 is an enlarged detail side view of a binding post as used herein to be later described.

Figure 1:
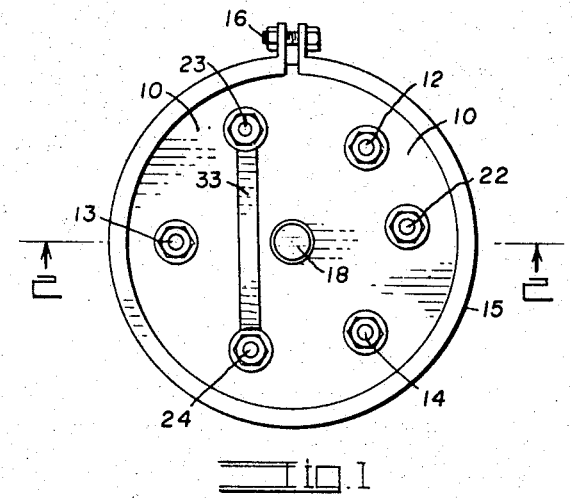
FIG. 1 is a top plan view of the automotive starter switch of this invention.
Figure 2:
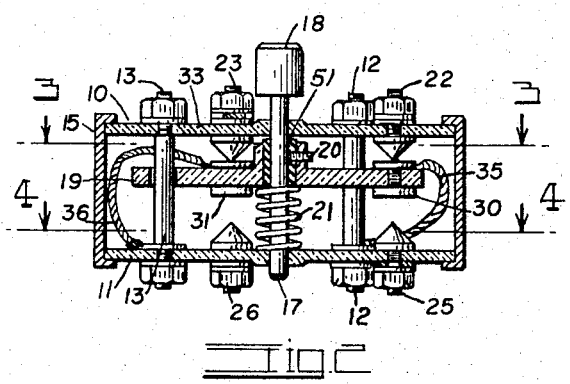
FIG. 2 is a diametric cross-section therethrough, taken on the line 2—2, FIG. 1.
Figure 3:
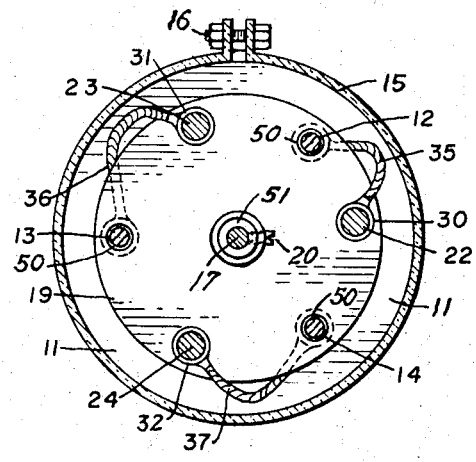
FIG. 3 is a horizontal cross-section looking downwardly on the line 3—3, FIG. 2.

In FIGS. 5 and 6, closed, energized circuits are shown in solid line and open, deenergized circuits are shown in broken line.

The improved starter switch employs a top insulating disc 10 and a bottom insulating disc 11 which are preferably circular and similar in size and shape. The discs 10 and 11 are maintained in fixed, parallel, spaced relation by means of shouldered spacing bolts 12, 13 and 14 provided with suitable disc clamping nuts at their respective extremities. The space between the two discs is peripherally closed by means of a housing band 15 which may be removably secured in place in any desired manner such as by means of a clamp bolt 16. A vertically-slidable push rod 17 extends axially through both discs 10 and 11 and terminates above the top disc 10 in an actuating button 18.

A circular contact plate 19 of insulating material is positioned for vertical movement between the discs 10 and 11. The contact plate is provided with a resilient rubber hub sleeve 51 through which the push rod 17 passes and is fixed against relative longitudinal movement on the rod in any suitable manner, such as by means of a suitable set screw 20. The contact plate 19 is of less diameter than the top and bottom discs and is provided with three openings 50 which slidably and relatively loosely receive the three spacing bolts 12, 13 and 14 to prevent rotation of the plate 19 and yet allow free vertical and tilting movement of the plate 19. The contact plate 19 and the push rod 17 are constantly and resiliently urged upwardly by means of a compressed helical spring 21 which surrounds the rod 17 between the plate 19 and the bottom disc 11.

The top disc 10 is pierced by three concentrically positioned, spaced-apart, upper binding posts 22, 23 and 24 and the bottom disc 11 is similarly pierced by three lower binding posts 25, 26 and 27 which are similar to, and in respective axial alignment with, the upper binding posts 22, 23 and 24.

Each of the binding posts is provided with a contact point 28 at its one extremity and with one or more suitable clamp nuts 29 at its other extremity as shown in detail in FIG. 7. The lower binding posts have their contact points directed upwardly from the lower disc with their clamp nuts exposed on the bottom of the latter while the upper binding posts have their points directed downwardly from the upper disc with their clamp nuts exposed on the top of the latter.

Three metallic, spool-like, contact elements 30, 31 and 32 are mounted in and extend through the contact plate 19 so as to be exposed on both the upper and lower surfaces of the latter. The contact elements 30, 31 and 32 are positioned so as to individually align with the upper and lower binding posts so that when the contact plate 19 is in its uppermost position, the elements 30, 31 and 32 will electrically contact the points on the upper binding posts 22, 23 and 24, respectively, and when the plate 19 is in its lowermost position, the elements 30, 31 and 32 will electrically contact the points on the lower binding posts 25, 26 and 27, respectively.

A first bypass strap 33 on the top disc 10 permanently and electrically connects the two upper binding posts 23 and 24 together and a similar second bypass strap 34 on the bottom disc 11 permanently and electrically connects the two lower binding posts 25 and 27 together. A first flexible conductor 35 permanently and electrically connects the contact element 30 to the spacing bolt 12. A second flexible conductor 36 electrically connects the contact element 31 to the spacing bolt 13 and a third flexible conductor 37 similarly connects the contact element 32 to the spacing bolt 14. Therefore, the three spacing bolts 12, 13 and 14 form the external circuit terminals for the three contact elements 30, 31 and 32 of the movable contact plate 19.

System connections

The automotive circuits are connected to the improved switch, as diagrammatically indicated in FIGS. 5 and 6, by connecting all of the positively grounded accessories, indicated at 52, to the upper accessory binding post 24, by means of an accessory conductor 38, and positively grounding upper ground binding post 22, by means of a ground conductor 39. The lower starter binding post 25 is then connected by means of a starter cable 40 to a terminal of the starting motor, shown at 41, the other terminal of which is grounded as indicated at 42.

The negative pole of a first positively grounded battery 43 is connected by a battery conductor 44 to the spacing bolt 14. The positive pole of a second similar battery 45 is connected to the spacing bolt 12, as indicated at 46, and the negative pole of the second battery 45 is connected to the spacing bolt 13 by a second battery conductor 47. The ignition switch, indicated at 48, is connected to the negative pole of the second battery 45 as shown at 49. For a negatively grounded installation, the above polarities would be reversed.

Operation

It can be seen from following the circuits in FIG. 5 and FIG. 6: that, if the contact plate 19 be in its uppermost position as shown in FIG. 5, an accessory circuit will be closed from the negative pole of the positive grounded first battery 43 to the accessories 52 through elements 44, 14, 37, 32, 24 and 38; and a second accessory circuit will be closed from the negative pole of the second battery 45 to the accessories through elements 47, 13, 36, 31, 23, 33, 24 and 38 to the accessories 52 and from the positive pole of the second battery 45 to the ground through the elements 46, 12, 35, 30, 22 and 39. Thus, the two batteries are simutlaneously operating in parallel on the accessories 52.

It can now be seen that if the contact plate 19 be depressed to the starting position of FIG. 6, the above parallel accessory circuits will be completely disconnected and a series circuit will be closed from the negative pole of the positively grounded first battery 43 through elements 44, 14, 37, 32, 27, 34, 25, 30, 35, 12 and 46, to the positive pole of the second battery 45 and thence from the negative pole of the latter battery through elements 47, 13, 36, 31, 26, and 40 and through the starter motor 41 to the ground. Thus, the two batteries are operating in series on the starter motor. Since the ignition switch 48 is permanently connected to the negative pole of the second battery, the ignition circuit will receive six volts in the parallel or running position and twelve volts in the series position to facilitate initiating the ignition.

It will be noted that since the plate 19 is resiliently tiltable, due to the rubber hub sleeve 51 and since there are three uniformly spaced contacts thereon, a three-point suspension is provided and the plate contacts will contact the post points with uniform pressure regardless of any inaccuracies in vertical positions of the points. In fact, inaccuracies will provide self-cleaning, wiping contacts. Corroded contacts can be quickly filed and cleaned by simply removing the enclosing band 15 and a solenoid plunger can be connected to the push rod, similarly to present starter switches for remote control if desired.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. An automotive starter switch comprising:
   (1) an upper insulated disc provided with electrical contacts facing downwardly;
   (2) a lower insulated disc provided with electrical contacts in axial alignment with the contacts on the upper disc and facing upwardly;
   (3) supporting means acting to fixedly maintain said discs in parallel spaced-apart relation;
   (4) an insulated contact plate positioned between said discs and provided with interconnected unitary electrical contacts passing completely through said plate and facing both upwardly and downwardly in axial alignment with the contacts on said discs;
   (5) means preventing rotation of said plate so as to maintain the contacts thereon in respective axial alignment with the contacts on said upper and lower discs; and
   (6) means for reciprocally moving said plate between said discs to place the plate contacts alternately in contact wtih the contacts of said discs.

2. An automobile starter switch as described in claim 1 having battery conductors leading from two independent batteries leading to the contacts on said plate, the contacts on the first disc being interconnected so that when they are in contact with the plate contacts said batteries will be connected in parallel relation, the contacts on the second disc being interconnected so that when they are in contact with the plate contacts said batteries will be connected in series relation.

3. An automobile starter switch as described in claim 1 in which the means for reciprocally moving said plate comprises:
   (1) a push rod axially slidable through said discs; and
   (2) a resilient hub-sleeve positioned between said push rod and said plate allowing said plate to be tilted relative to said push rod to provide uniform contact between the plate contacts and the disc contacts.

4. A switch as described in claim 1 in which the downwardly facing contacts in the upper disc and the upwardly facing contacts in the lower are conically pointed to provide contact points and in which the contacts in the contact plate comprise metallic spool-like elements with flat, enlarged, disc-like upper and lower extremities which, respectively, lie against the upper and lower surfaces of said plate to provide flat contact surfaces for said contact points.

References Cited

UNITED STATES PATENTS

| | | | |
|---|---|---|---|
| 2,190,402 | 2/1940 | Curzon | 200—16 XR |
| 2,215,584 | 9/1940 | Hetherington | 200—16 XR |
| 2,459,015 | 1/1949 | Clement | 200—16 XR |
| 2,692,920 | 10/1954 | Brown | 200—16 |

LEWIS H. MYERS, *Primary Examiner.*

J. R. SCOTT, *Assistant Examiner.*